(12) United States Patent
Boback et al.

(10) Patent No.: US 9,088,545 B2
(45) Date of Patent: Jul. 21, 2015

(54) SNIPPET MATCHING IN FILE SHARING NETWORKS

(71) Applicant: Tiversa IP, Inc., Pittsburgh, PA (US)

(72) Inventors: Robert J. Boback, Moon Township, PA (US); Anju Chopra, Gibsonia, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 16 days.

(21) Appl. No.: 14/018,705

(22) Filed: Sep. 5, 2013

(65) Prior Publication Data

US 2014/0075542 A1    Mar. 13, 2014

Related U.S. Application Data

(60) Provisional application No. 61/697,916, filed on Sep. 7, 2012.

(51) Int. Cl.
| | |
|---|---|
| *H04L 9/00* | (2006.01) |
| *H04L 29/06* | (2006.01) |
| *G06F 21/10* | (2013.01) |
| *G06F 21/62* | (2013.01) |

(52) U.S. Cl.
CPC ............ *H04L 63/0272* (2013.01); *G06F 21/10* (2013.01); *G06F 21/6272* (2013.01)

(58) Field of Classification Search
CPC . H04L 63/0272; H04L 29/06; H04L 12/4641; H04L 63/08; H04L 63/20; H04L 63/164; G06F 21/10; G06F 21/6272
USPC ............................................ 726/15; 713/176
See application file for complete search history.

(56) References Cited

U.S. PATENT DOCUMENTS

| | | | |
|---|---|---|---|
| 8,032,757 B1 | 10/2011 | Zhao et al. | |
| 8,386,792 B1 * | 2/2013 | Zhao et al. | .................... 713/180 |
| 2003/0120947 A1 | 6/2003 | Moore et al. | |
| 2003/0172066 A1 | 9/2003 | Cooper et al. | |
| 2007/0294544 A1 | 12/2007 | Ishikawa et al. | |

OTHER PUBLICATIONS

International Search Report and Written Opinion mail date Nov. 29, 2013 for International Application No. PCT/US2013/058163 for Tiversa IP, Inc. filed on Sep. 5, 2013, 8 pages.

Rose, Ian, "Exposure of Sensitive Files in File Sharing Networks," CS 199r, Spring 2007, 6 pages.

* cited by examiner

*Primary Examiner* — Baotran N To
(74) *Attorney, Agent, or Firm* — Cesari and McKenna, LLP

(57) ABSTRACT

Techniques for matching information representing private files against files obtained from a public network.

18 Claims, 15 Drawing Sheets

Total File Match Report

This report shows the full file path and sha1 for each matching file.

| Private File Name | Path | Public File Name | Path | sha1 Sha1 |
|---|---|---|---|---|
| [188.44.65.219]noham 2000.pptx | \\dev8\ec\ppt | [188.44.65.219]noham 2000 (1).pptx | \\dev8\cc\ppt | 58a0888aef889197b6363974ae2c40d18e6745327 |
| [188.44.65.219]noham 2000.pptx | \\dev8\ec\ppt | [188.44.65.219]noham 2000.pptx | \\dev8\cc\ppt | 58a0888aef891576b363974ae2c40d18e6745327 |
| [46.226.241.227]nres_rus.msg | \\dev8\ec\msg | [46.226.241.227]nres_rus.msg | \\dev8\cc\msg | 2d36d26365b4eb2be99dc7d10e3ff281e2047a6db |
| [46.226.241.227]nres_trk.msg | \\dev8\ec\msg | [46.226.241.227]nres_trk.msg | \\dev8\cc\msg | 94ad24a2fbc70f0794adbe5f03b3739de897cd8 |
| [5.12.59.193]southpark-101.txt | \\dev8\ec\txt | [5.12.59.193]southpark-101.txt | \\dev8\cc\txt | 05c166a6f1703b4e74c95def02f198bd36df9b57 |
| [5.12.59.193]southpark-102.txt | \\dev8\ec\txt | [5.12.59.193]southpark-102.txt | \\dev8\cc\txt | dc5105ee568b9853a19e16cd66d6172b6b311c980e |
| [5.12.59.193]southpark-103.txt | \\dev8\ec\txt | [5.12.59.193]southpark-103.txt | \\dev8\cc\txt | bbbe5939d6da5e78b611aae06b72c24c7a08a58 |
| [5.12.65.161]Protestul maimutek \\dev8\ec\word | [5.12.65.161]Protestul maimutelor-r | \\dev8\cc\word | 1f1ba514da27378f1fa4b1f7018f6dea5ffcd6547 |
| [5.12.65.161]Realizari si invenții c | \\dev8\ec\word | [5.12.65.161]Realizari si inventii rom | \\dev8\cc\word | 303def9735f6274fe60d1d7d62183244339dffcba6 |
| [50.129.73.111]Digital Booklet - G | \\dev8\ec\pdf | [50.129.73.111]Digital Booklet - Guts | \\dev8\cc\pdf | 4f8d6ba3cf6f5bcdde5aa7b80862bd3cacf8335a |
| [50.129.73.111]Digital Booklet - Lase | \\dev8\ec\pdf | [50.129.73.111]Digital Booklet - Lase | \\dev8\cc\pdf | 1067ae5ccc56913535e90d734b31088b24815835 |
| Total Matches | | 11 | | |

Fig. 11

File Match Report

This report shows the full file path, file size, words, and matching percentage for each matching file.

| Private File Name | Path | File Size | Words | Matched Snippets | Match % | Public File Name | Path | File Size | Words | Match % |
|---|---|---|---|---|---|---|---|---|---|---|
| [74.86.162.92]archive.index.php.f-10.html | \\dev7\dev8 | 52095 | 1104 | 1080 | 100 | [74.86.162.92]archive.index.php.f-10.html | \\dev7\dev8\f | 52095 | 1104 | 100 |
| [74.86.162.92]archive.index.php.f-10.html | \\dev7\dev8 | 52095 | 1104 | 99 | 9 | [74.86.162.92]archive.index.php.f-90.html | \\dev7\dev8\f | 71723 | 1544 | 6 |
| [74.86.162.92]archive.index.php.f-10.html | \\dev7\dev8 | 52095 | 1104 | 99 | 9 | [74.86.162.92]archive.index.php.f-90.html | \\dev7\dev8\f | 71723 | 1544 | 6 |
| [74.86.162.92]archive.index.php.f-10.html | \\dev7\dev8 | 52095 | 1104 | 63 | 5 | [74.86.162.92]archive.index.php.f-43.html | \\dev7\dev8\f | 48414 | 944 | 6 |
| [74.86.162.92]archive.index.php.f-10.html | \\dev7\dev8 | 52095 | 1104 | 63 | 5 | [74.86.162.92]archive.index.php.f-43.html | \\dev7\dev8\f | 48414 | 944 | 6 |
| [74.86.162.92]archive.index.php.f-10.html | \\dev7\dev8 | 52095 | 1104 | 55 | 5 | [74.86.162.92]archive.index.php.f-23.html | \\dev7\dev8\f | 47409 | 1060 | 5 |
| [74.86.162.92]archive.index.php.f-10.html | \\dev7\dev8 | 52095 | 1104 | 55 | 5 | [74.86.162.92]archive.index.php.f-23.html | \\dev7\dev8\f | 47409 | 1060 | 5 |
| [74.86.162.92]archive.index.php.f-10.html | \\dev7\dev8 | 52095 | 1104 | 28 | 2 | [74.86.162.92]archive.index.php.f-158.html | \\dev7\dev8\f | 45360 | 1129 | 2 |
| [74.86.162.92]archive.index.php.f-10.html | \\dev7\dev8 | 52095 | 1104 | 28 | 2 | [74.86.162.92]archive.index.php.f-158.html | \\dev7\dev8\f | 45360 | 1129 | 2 |
| [74.86.162.92]archive.index.php.f-10.html | \\dev7\dev8 | 52095 | 1104 | 22 | 2 | [74.86.162.92]archive.index.php.f-22.html | \\dev7\dev8\f | 43344 | 992 | 2 |
| [74.86.162.92]archive.index.php.f-10.html | \\dev7\dev8 | 52095 | 1104 | 22 | 2 | [74.86.162.92]archive.index.php.f-22.html | \\dev7\dev8\f | 43344 | 992 | 2 |
| [74.86.162.92]archive.index.php.f-21.html | \\dev7\dev8 | 41220 | 1021 | 997 | 100 | [74.86.162.92]archive.index.php.f-21.html | \\dev7\dev8\f | 41220 | 1021 | 100 |
| [74.86.162.92]archive.index.php.f-21.html | \\dev7\dev8 | 41220 | 1021 | 997 | 100 | [74.86.162.92]archive.index.php.f-21.html | \\dev7\dev8\f | 41220 | 1021 | 100 |
| Devolatowa_ParkLa_Prairie182964.pdf | \\dev7\dev8 | 117953 | 7330 | 148 | 2 | Flat_RockMillsbourne344298.txt | \\dev7\dev8\f | 427304 | 76350 | 0 |
| Howards_GroveClear_Lake_ShoresNorgeBay | \\dev7\dev8 | 176639 | 11772 | 239 | 2 | ChristineThompson's_StationWindomNekoSec | \\dev7\dev8\f | 280891 | 50024 | 0 |
| LehighBarnwellSeat_PleasantSouth_Whittle | \\dev7\dev8 | 179766 | 12531 | 448 | 3 | Emerald_Lake_Hills Hunts_PointAptos_Hills | \\dev7\dev8\f | 825856 | 113953 | 0 |
| LehighBarnwellSeat_PleasantSouth_Whittle | \\dev7\dev8 | 179766 | 12531 | 448 | 3 | Emerald_Lake_Hills Hunts_PointAptos_Hills | \\dev7\dev8\f | 825856 | 113953 | 0 |
| LehighBarnwellSeat_PleasantSouth_Whittle | \\dev7\dev8 | 179766 | 12531 | 415 | 3 | Nevada_City567859.doc | \\dev7\dev8\f | 701440 | 113583 | 0 |
| LehighBarnwellSeat_PleasantSouth_Whittle | \\dev7\dev8 | 179766 | 12531 | 415 | 3 | Nevada_City567859.doc | \\dev7\dev8\f | 701440 | 113583 | 0 |
| Port_Republic101238.pdf | \\dev7\dev8 | 270219 | 15795 | 323 | 2 | ChristineThompson's_StationWindomNekoSec | \\dev7\dev8\f | 280891 | 50024 | 0 |
| SpearmanMaytownTilliamookLecrnardtown7 | \\dev7\dev8 | 162275 | 7126 | 143 | 2 | ChristineThompson's_StationWindomNekoSec | \\dev7\dev8\f | 280891 | 50024 | 0 |
| Union_ParkEast_Thermopolis Setauket-East_ | \\dev7\dev8 | 237963 | 17385 | 414 | 2 | Nevada_City567859.doc | \\dev7\dev8\f | 701440 | 113583 | 0 |
| Union_ParkEast_Thermopolis Setauket-East | \\dev7\dev8 | 237963 | 17385 | 414 | 2 | Nevada_City567859.doc | \\dev7\dev8\f | 701440 | 113583 | 0 |

Fig. 12

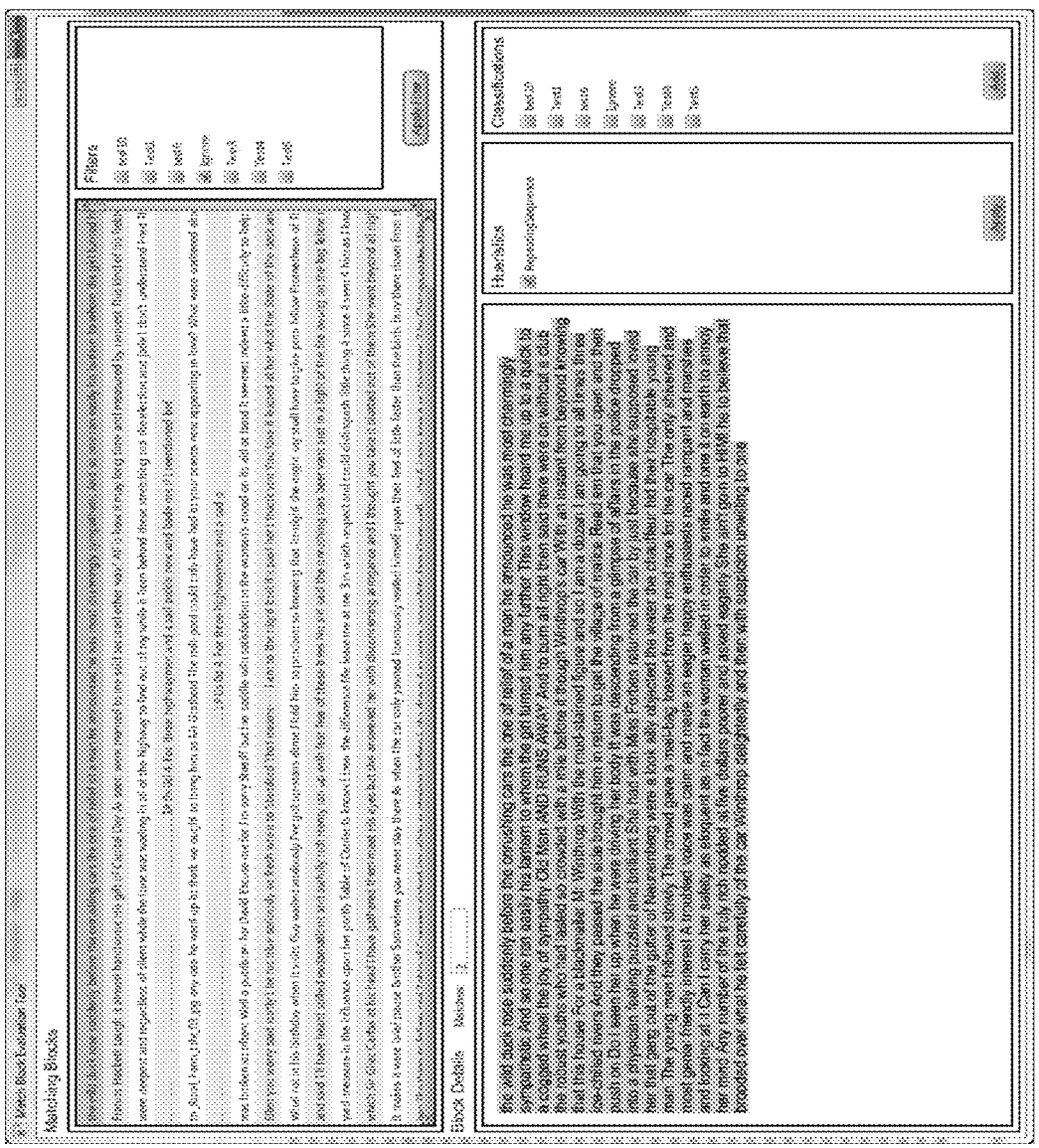

SNIPPET MATCHING IN FILE SHARING NETWORKS

CROSS-REFERENCE TO RELATED APPLICATION(S)

This application claims priority to and the benefit of U.S. Provisional Patent Application Ser. No. 61/697,916 filed Sep. 7, 2012.

BACKGROUND

1. Technical Field

This application relates to determining whether certain information is being shared in a computer network.

2. Background Information

File sharing is the practice of distributing or providing access to digitally stored information, such as computer programs, multimedia (audio, images and video), documents, or electronic books. Sharing mechanisms may include centralized servers, World Wide Web-based hyperlinked documents, or the use of file sharing networks. Sharing Networks may be implemented in a variety of ways such as using peer-to-peer technologies, bit torrent technologies, file hosting services and the like.

File sharing continues to rank as one of the most popular Internet applications. The ability to pool resources from thousands or millions of users makes filesharing an extremely attractive for a number of applications. However, such convenience and rapid accessibility to information is not without its risks. In particular, users that accidentally or unwittingly share private files can find personal and other sensitive information rapidly downloaded by other users all over the world.

Most businesses collect and store sensitive information about their employees and customers such as Social Security numbers, credit card and account information, medical and other personal data. Many of them have a legal obligation to protect this information against inadvertent disclosure. If such information gets in the wrong hands, it can lead to fraud and identity theft. People who use P2P filesharing software can end up inadvertently sharing files. They may accidentally choose to share drives and folders that contain sensitive information, or they could save a private file to a shared drive or folder by mistake, making a private file available to others. In addition, viruses and other malware can change the access to drives and folders designed for sharing, also putting private files at risk. As a result, instead of simply sharing their music files as intended, other sensitive information such as tax records, private medical records, work documents and so on end up being available via general circulation on filesharing networks.

The risks are very high for businesses as well as end users. For example, the United States Federal Trade Commission (FTC) has recently announced settlements against multiple companies who had illegally exposed sensitive personal information of their customers by allowing it to be shared on peer to peer (P2P) networks. These enforcement actions point out the serious implications of inadequate or nonexistent data privacy and security policies.

There are audit services for hire that can locate sensitive data in an organization and determine what sort of access can be gained to it via file sharing networks. In government and military end uses that can use in-depth standards for classifying the sensitivity of data such as "secret", "top-secret" and so on. These classifications detail who can have access to the information and what level of security assurance should be implemented to protect against inadvertent disclosure.

Several problems occur when attempting to locate private files that include sensitive information on file sharing networks. The owner or custodian of the information wants to know if their file is being shared, but also even if pieces of the file are being shared. For example, a long list of credit card numbers may be compromised even if a small number of the credit card numbers are exposed. In addition, sensitive information may be rearranged or combined with other information to obfuscate it. Furthermore, the sensitive content may be split among multiple files. In addition the private file may contain classified or other highly sensitive information and yet the custodian of the information wishes to be able to avail themselves of the commercial services to locate the information, but without disclosing it entirely.

SUMMARY

The present disclosure provides for matching private files against files available via a public network (such as a web server, P2P network, BitTorrent, etc.) to determine if information content of a private file has been leaked. The set of tools operates on pieces of information obtained from or about private files, which affords a number of advantages including greater processing throughput, the ability to handle different types of content, and the ability to search for classified information without disclosing the information itself.

In specific embodiments, techniques are provided for matching pieces of a private file against public files available on filesharing networks. A process makes use of for example at least a snipper tool, a matcher tool and a post match tool.

The snipper tool extracts the content of files into a stream of words and breaks that stream into rolling chunks of a configurable size called a snippet. For example, given a snippet size of 25 in a stream of 50 words, the snipper tool breaks up the stream of 50 words into 26 snippets, each 25 words long. A hash is then calculated for each snippet.

The matcher tool loads all the hashes calculated for all of the generated snippets for all of the private files. For each public file located on a file sharing network, a set of snippets and hashes are then generated using the same snippet process described above. To perform a match, the resulting hashes of the public files are compared to a map of the private hashes. Results of the matching process, such as a list of matching files, is then persisted such as to a database.

The post match tool examines all of the resulting matching files and aggregates consecutive matching snippets into contiguous blocks of matching words. The result is then persisted such as to a database. Contiguous matching blocks can then be examined via match evaluation user interfaces, such as may be presented to human analysts, to obtain greater details about the specific matches between files.

In a specific embodiment, the user interface can allow a human analyst to launch the matching/snippet processes against a directory of public files located on one or more file sharing networks. The matcher performs the same snippet process against the public files, and summary information from that result is then persisted to a database.

A snippit match evaluation user interface can further permit the analyst to examine matches between two files. The user interface can, for example, present a side-by-side view of a match with the private information shown on the left and the public information shown on the right. A list of matching files can be shown in a scrollable list. When a user selects a private and public file the match view can present, for example, a summary of the percent of match found. Colors such as red green and yellow or lack thereof can be used to indicate degree of match.

The matching process can also examine all matching snippets and determine blocks of continuous matching sections between matching files. A preview of each block can be presented such as in a scrollable list on one portion of the screen. The blocks can be sorted, a order such as, for example, with the matching block found having the highest number of files being sorted first.

Further embellishments can be provided to the implementation. For example, if the private file contains highly sensitive information, it may not be desirable for the owner of the private file to provide a complete copy of the same to an external service provider. The owner can instead provide only pieces of the private file which they seek to locate, or can even provide only the hash information to the tool.

Snippet size can be determined by analysts or determined via heuristics. Other heuristics may be applied by the analyst to for example to concentrate on which information is most important, either by automatic or manual processes.

BRIEF DESCRIPTION OF THE DRAWINGS

The invention description below refers to the accompanying drawings.

FIG. 5 is an example SpoolerBatch table.

FIG. 7 is an example SnipperBatch table.

FIG. 10 is example summary information stored concerning matching files.

FIG. 11 is a Total File Match Report.

FIG. 12 is a File Match Report.

FIG. 15 is a Match Block Evaluation Tool.

DETAILED DESCRIPTION OF AN EMBODIMENT

Overview

The system provides a set of data processing tools for matching private files that contain sensitive information against files downloaded from a public network. The tools determine if all or part of the content of a private file has been leaked to the public network. The set of tools typically include at least a Snipper, a Matcher, and a PostMatch element.

Snipper

The Snipper tool extracts the content of files into a stream of words and breaks the stream into rolling chunks of words of a configurable size (i.e. a "snippet"). For example, given a snippet size of 25 and a stream of 50 words, the Snipper will break up the 50 words into 26 snippets of 25 words long [length:]

| Snippet 1 | words 1-25 |
| Snippet 2 | words 2-26 |
| ... | |
| Snippet 26 | words 26-50 |

A hash is calculated for each snippet in order to facilitate later matching of the snippet.

Matcher

The Matcher tool loads all of the hashes calculated for all of the generated snippets for all of the private files into a memory-based map. For each public file, a set of snippets and hashes are then also generated using the same snippet process described above.

To perform the match, the hashes of the public file are compared to map of the private hashes. Results of the matching process (e.g. a complete list of matching files) are then placed in a persistent storage device such as a database.

PostMatch

The PostMatch tool examines all of the persisted matching files and aggregates consecutive matching snippets into contiguous blocks of matching words. The results of this process are persisted (to a database or to the file system) in a .match file. The contiguous matching blocks are then used by the match evaluation. User interfaces can present the match information to analysts to obtain greater details about the specific matches between files.

Architecture

Figure 1:
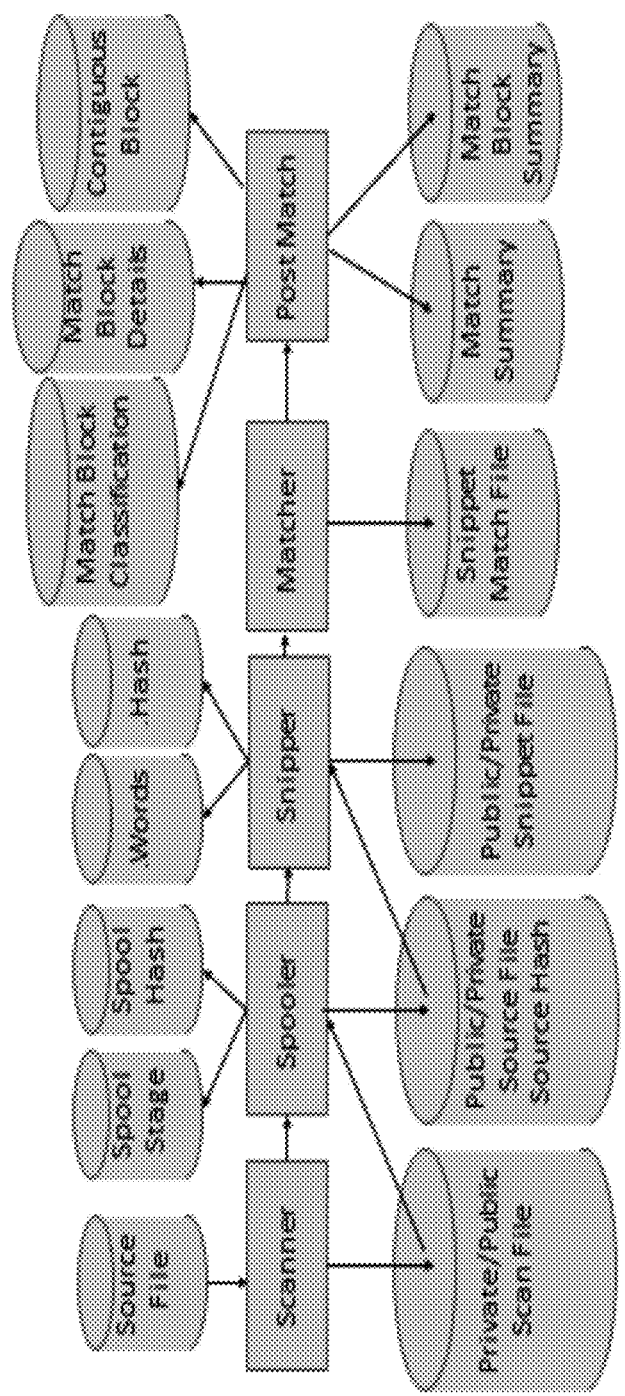
FIG. 1 is a high level architecture of a system that determines if private information has been leaked to a public network.

FIG. 1 illustrates a high level system architecture.

The Scanner component is responsible for collecting files, private and public, from the file system for processing by the remaining components. Private files may be obtained from users of the system, or submitted by customers to a service provider who is operating the system on behalf of others. Private files will typically included digitally coded information representing a human-readable document with sensitive private information and may be generated by an application program such as a word processor, spreadsheet program, presentation slide program, database, web browser, executing process output capture, or similar application that creates an output digital file.

Public files are located by searching public file networks. These may include file servers, web servers, peer to peer (P2P) networks, Bit Torrent networks, and any other technology that permits sharing of information. Other protocol engine machines (not shown here) may continually scan P2P, BitTorrent and other networks to locate and store large numbers of public files for later use by the system.

The Spooler processes files provided by the Scanner component. The spooler copies each file to a staging area and calculates the SHA-1 (or other hash) of the file. Once the SHA-1 is calculated, the file is renamed to a SHA-1-based name in the Spool Hash directory. An entry is added to the database for each spooled file.

The Snipper then extracts the content of each file provided by the Spooler into a stream of words, breaks the words into a set of rolling snippets and calculates a hash for each snippet. The associated hashes and words are written to the file system and summary information is written to the database.

The Matcher calculates matches by comparing hashes for each private file against the hashes for each public file. Results of these set matches are written to the database.

The Post Match component collects details about each matching file, aggregates matching snippets into matching contiguous blocks, and executes heuristics to automatically classify the contiguous blocks.

The architecture of FIG. 1 seeks to achieve the following.

High Throughput. High throughput is provided by running processors in parallel. While new files are scanned, previously scanned files can be spooled. While new files are spooled, previously spooled files can be snipped. While new files are snipped, previously snipped files can be matched. While new files are matched, previously matched files can be processed by the Post Matcher. Extensive use of memory, especially in the Matcher component, also contributes to the highest possible throughput.

Scalability. Each processor processes batches of work. The number of threads for each process is set by the configuration, Scaling is provided by increasing the number of threads for the process and/or using multiple machines to run additional processor.

Figure 2:
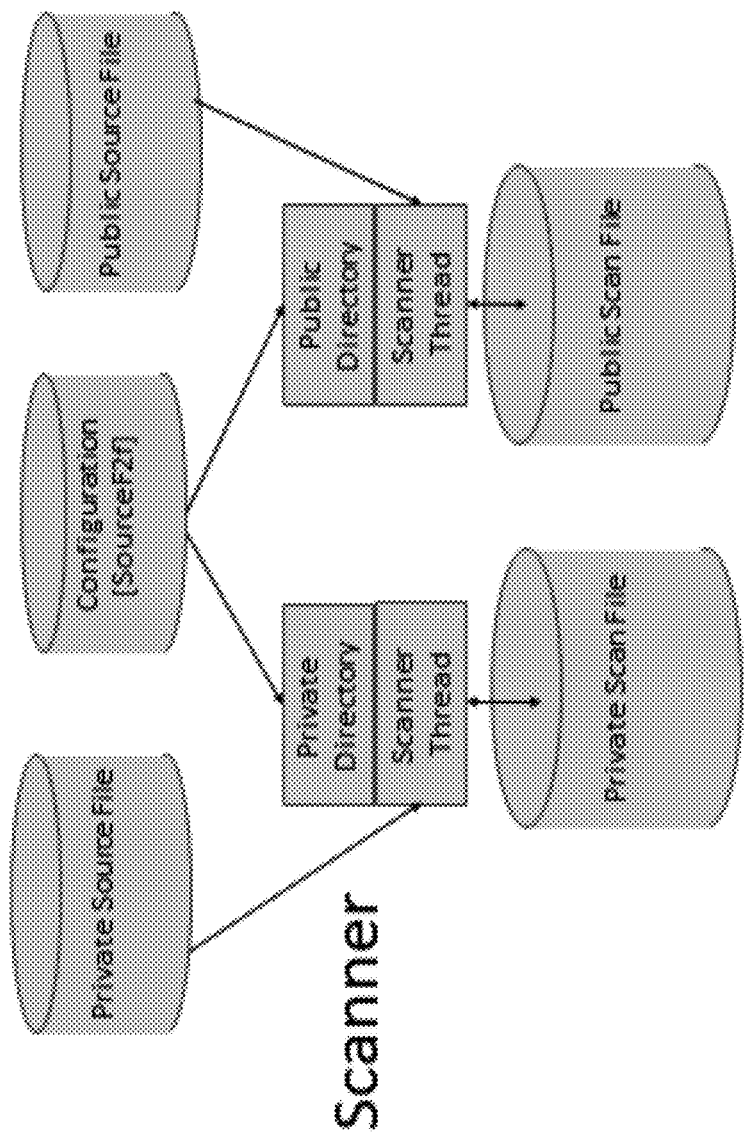
FIG. 2 shows a scanner component in more detail.

Scanner (FIG. 2)

The Scanner component is responsible for collecting files for analysis by the remaining components. To collect files from a directory, an analyst adds the directory to a list of Scanner directories using a configuration Graphical User Interface (GUI.)

Figure 3:
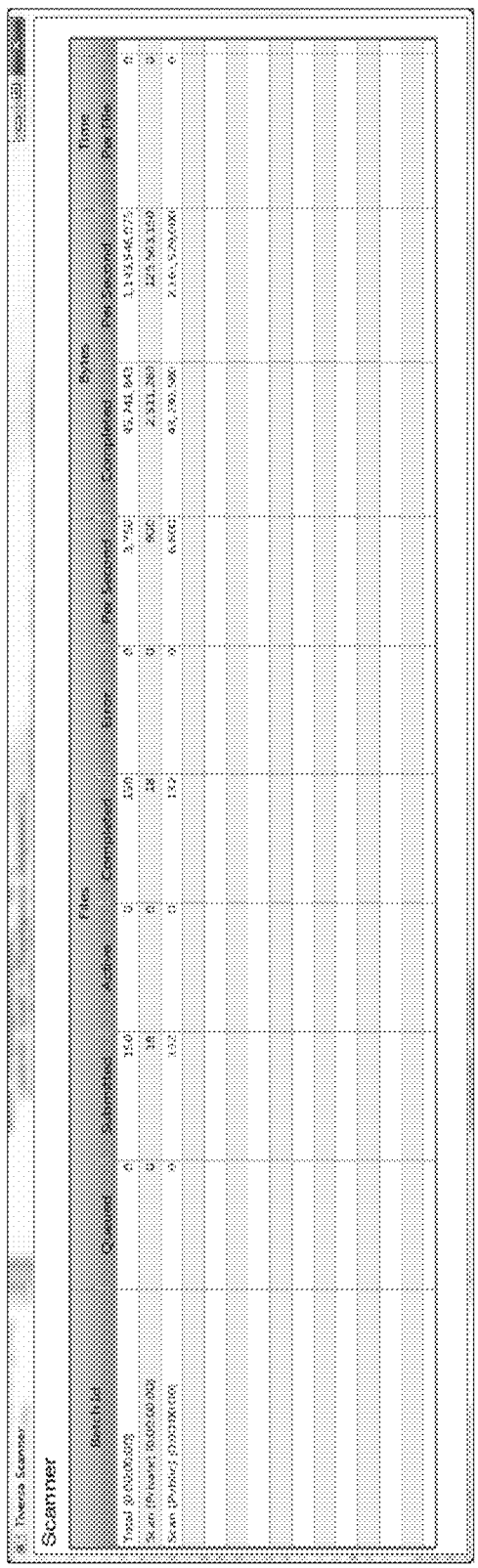
FIG. 3 is an example Public/Private scan table.

The Scanner creates one thread for every configured directory [SourceF2f]. Each scanner thread scans its assigned directory looking for new or modified files. Files are considered new if the file does not exist in the Private/Public Scan File tables or the Public/Private Source File tables. The scanning process populates the Public/Private Scan File tables (FIG. 3). When the Spooler spools a scanned file, the Spooler will populate the Public/Private Source File tables.

A Last Access Time attribute is saved to the tables above and is used to determine if a file has been modified. A modified file will be scanned in at the next run of the Scanner and will add another entry in the Scan File tables.

Figure 4:
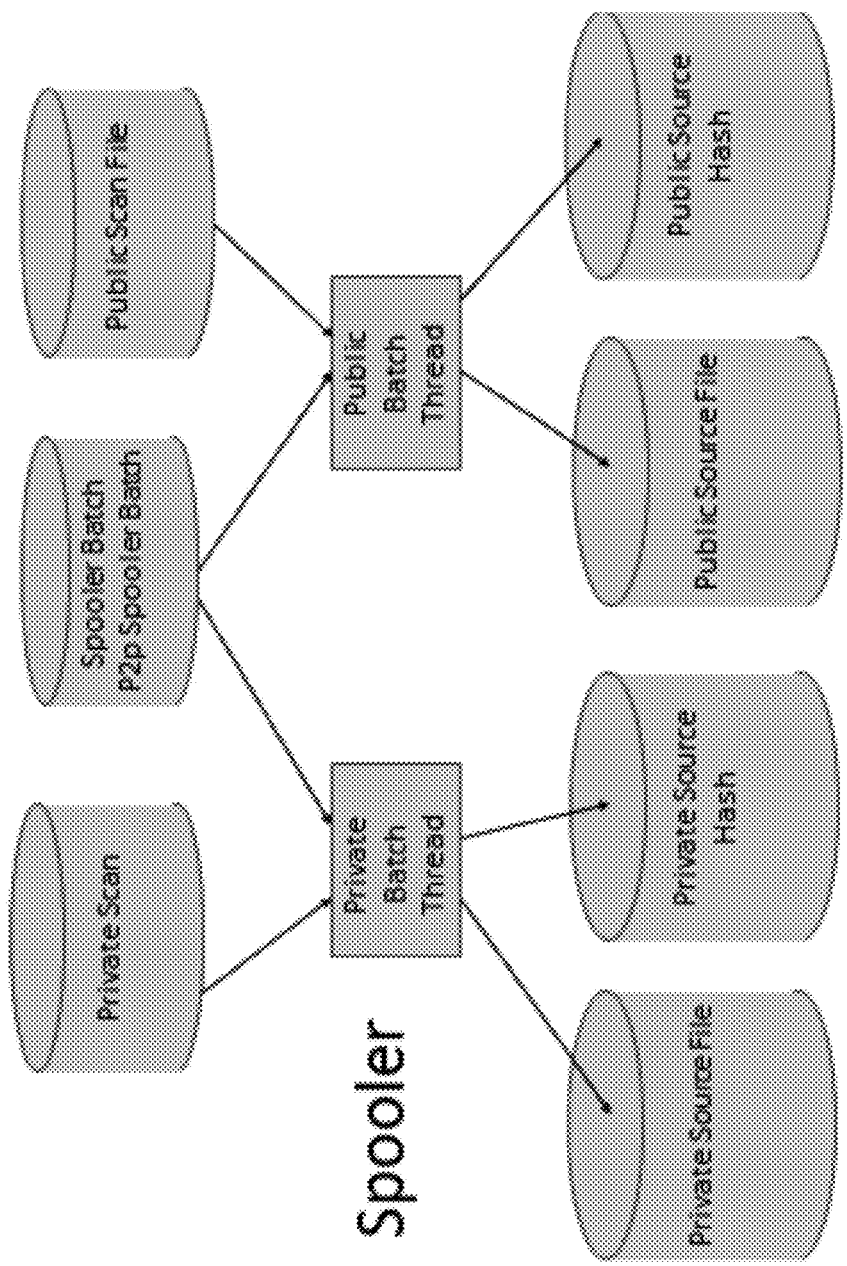
FIG. 4 shows a spooler component.

Spooler (FIG. 4)

The Spooler component is responsible for collecting scan files for analysis by the remaining components. The files to be collected are the list of files persisted by the Scanner component. All files from the PrivateScan and PublicScan tables are processed.

Figure 5:
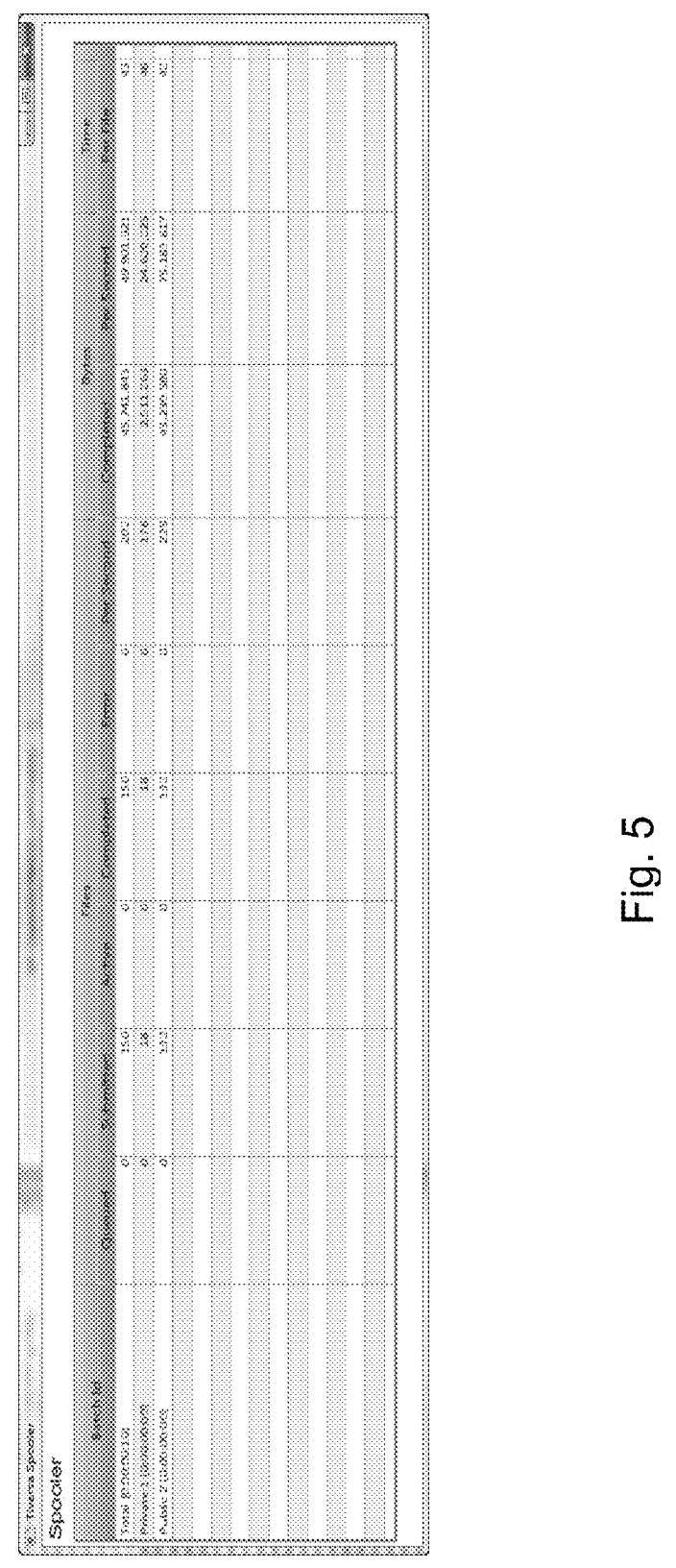

The Spooler processes batches [SpoolerBatch table] (FIG. 5) of files from the Private/Public Scan File table or the files from the P2P or other protocol engines [P2pSpoolerBatch]. The Spooler copies each file to a staging area and calculates the SHA-1 of the file. Once the SHA-1 is calculated, the file is renamed to a SHA-1-based name in the Spooler directory. An entry is added to the Private/Public Source File table for each file and if the file is unique, an entry will be added to the Private/Public Source Hash table.

Figure 6:
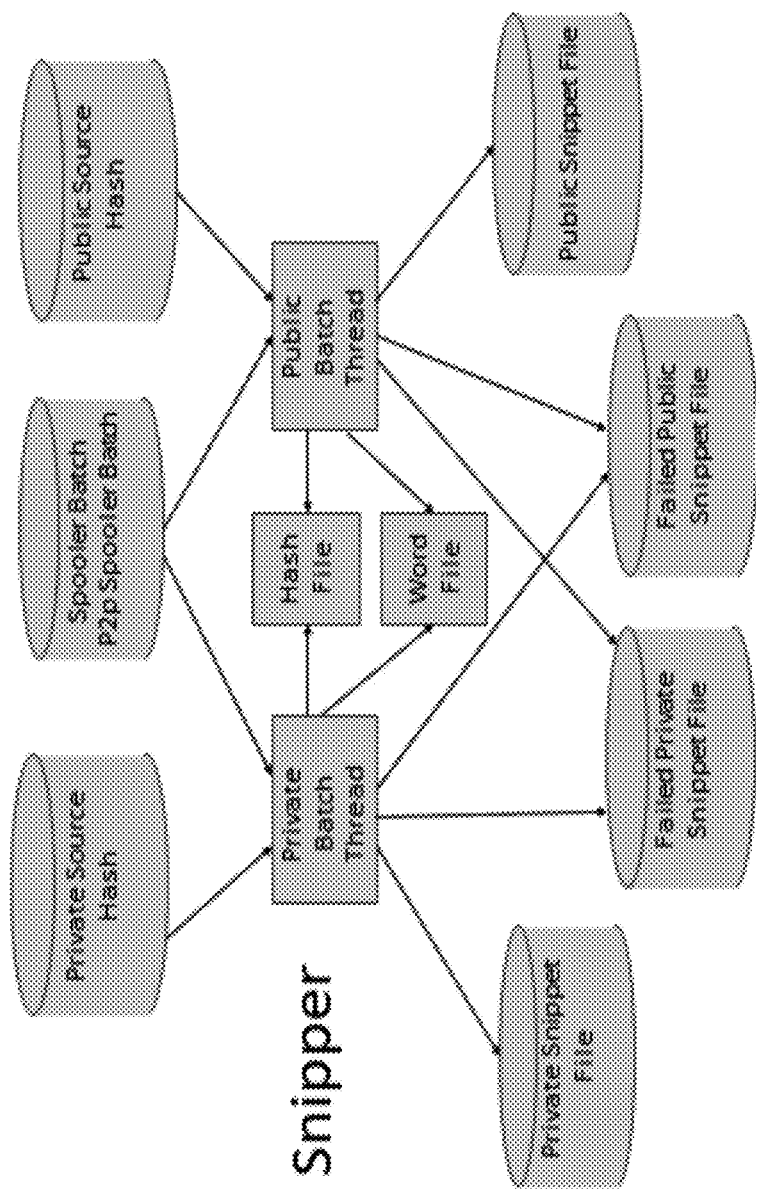
FIG. 6 shows a snipper component.

Snipper (FIG. 6)

The Snipper component is responsible for processing files collected for analysis by the Spooler component. Once files have been correctly spooled into the system, the Snipper will extract the content of each file and writes the associated hashes and words into the file system as directed by the Snippet Hash and Snippet Word directories as configured by the configuration.

Figure 7:
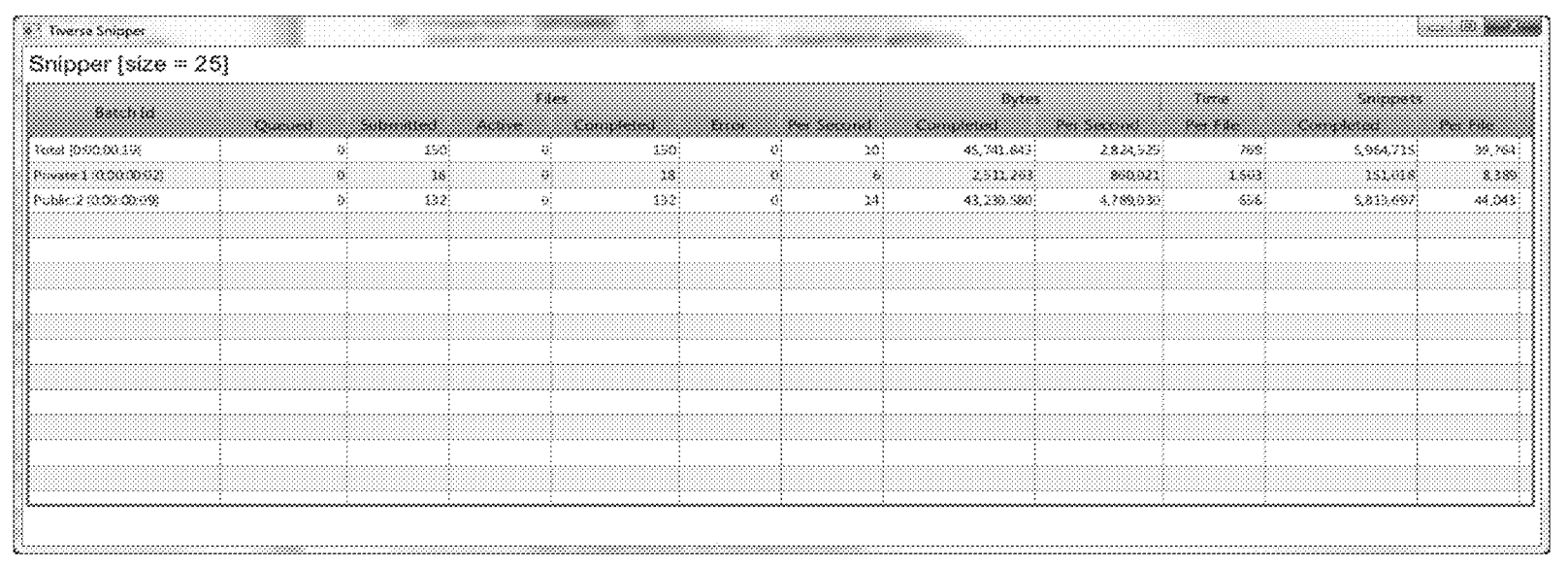

The Snipper processes batches [SnipperBatch table] (FIG. 7) of files from the Private/Public Source Hash tables. The snipper generates a hash file and a word file for each Private/Public Source Hash file in the batch. A entry is also added to the Private/Public Snippet File table file for each Private/Public Source Hash file in the batch.

If a batch contains files that failed to snip correctly, then an entry in the Failed Private/Public Snippet File table will be added for each failed file.

Figure 8:
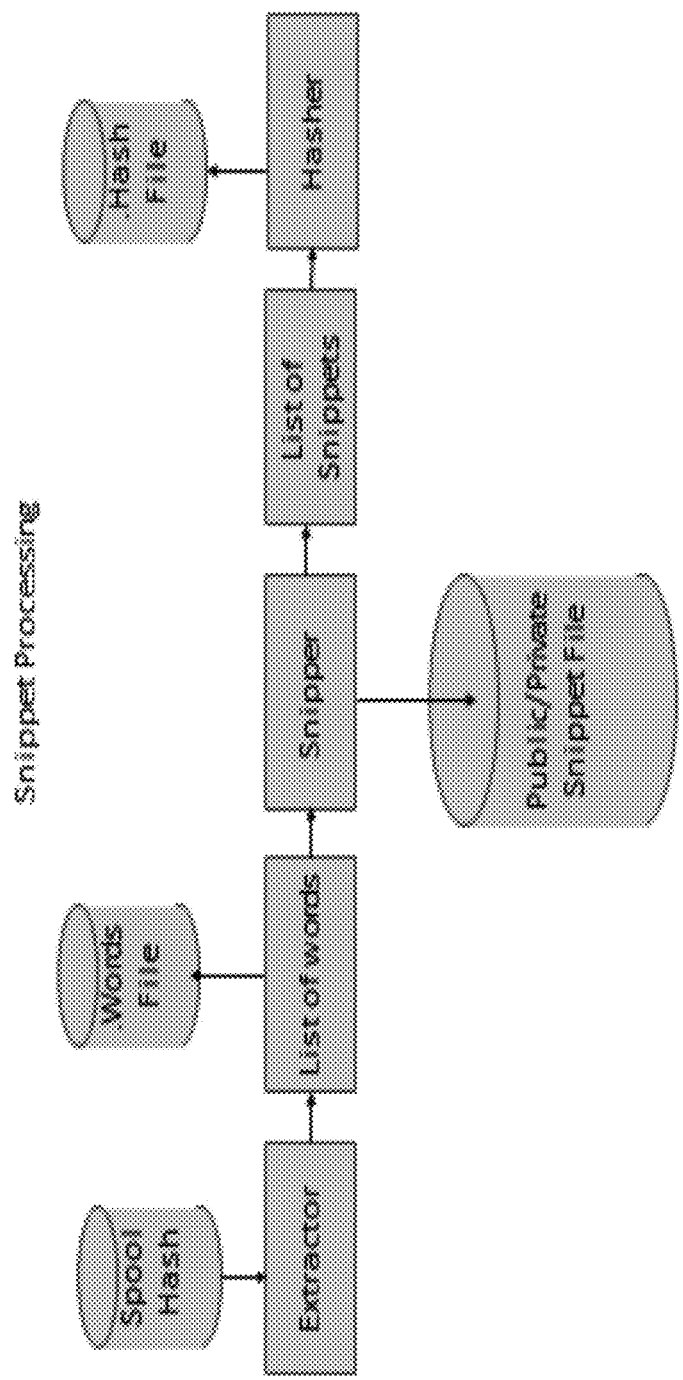
FIG. 8 shows an extraction process for "snipping" a file.

Extraction (FIG. 8)

The first step in "snipping" a file is to extract the content from each file in the form of a stream of words. All formatting and punctuation is removed.

The first step in the snipping process is extraction. The extractor reads the content of the spool file and generates a stream of words. The stream of words is then separated into smaller lists of consecutive words, known as a "Snippet". The "snippet size" determines how many words a "snippet" will contain. To ensure the most complete matching, the stream of words is separated into "rolling snippets". Rolling snippets are small lists of consecutive words that are offset by one word—see below:

```
File [Snippet Size = 5]
    The quick brown fox jumps over the lazy dog.
    Five Rolling Snippets:
        The quick brown fox jumps
        quick brown fox jumps over
        brown fox jumps over the
        fox jumps over the lazy
        jumps over the lazy dog
```

For each rolling snippet, a hash is calculated to optimize the matching process. The hashes are saved to a .hash file and the complete list of words is saved to the .words file. Summary information about each file is written to the database.

Figure 9:
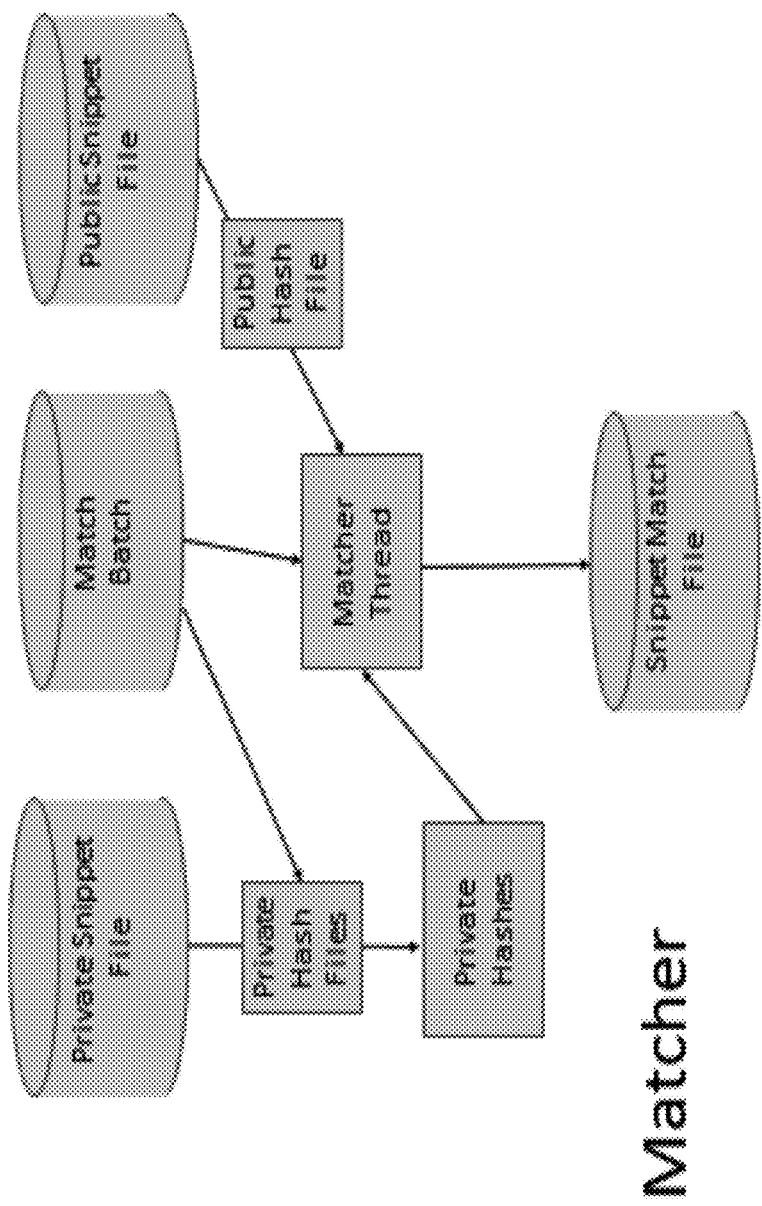
FIG. 9 shows a matcher component.

Matcher (FIG. 9)

The Matcher component is responsible for matching hashes created by the Snipper component.

The Matcher loads hashes from the private snippet files. Based on the Hash Limit configuration, the Matcher will break up the private snippet file hashes into batches to manage the amount of memory used by the Matcher.

Figure 10:
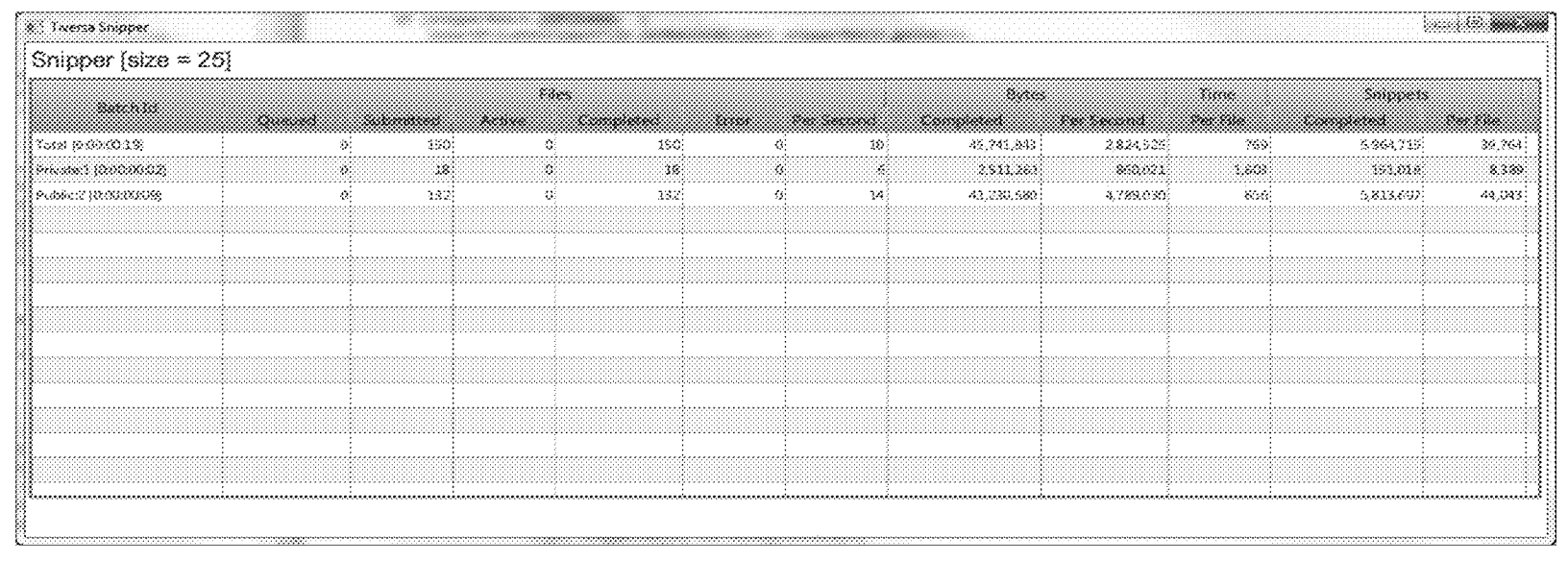

Once the private file hashes have been loaded, the public files are collected into batches. Processing one batch of public files at a time, the Matcher loads the hashes of each public file in the batch and compares the hashes to the previously loaded private file hashes. Summary information about each set of matching files is saved to the database (FIG. 10).

Post Matcher

The Post Match component is responsible for performing additional processing against the matched files detected by the Matcher component. The Post Match process aggregates consecutive matching snippets between a private and public file into Contiguous Blocks. For each matching private and public file one or more contiguous blocks will be determined [see example below].

```
Private File [Snippet Size = 5]
Content = ............................... The quick brown fox jumps over the lazy dog ...........
Public File [Snippet Size = 5]
Content =.................. The quick brown fox jumps over the lazy dog
..........................................
................................................ The   quick brown fox jumps over the lazy dog
................. .......... The quick brown fox jumps over   the lazy dog
..............................................
Private File Matching Snippets [Snippet Size = 5]
The quick brown fox jumps
    quick brown fox jumps over
        brown fox jumps over the
            fox jumps over the lazy
                jumps over the lazy dog
Private File Contiguous Blocks
The quick brown fox jumps over the lazy dog, starting offset =x, ending offset=y, other offset = z
Public File Matching Snippets [Snippet Size = 5]
The quick brown fox jumps [3 instances]
    quick brown fox jumps over [3 instances]
        brown fox jumps over the [3 instances]
            fox jumps over the lazy[3 instances]
                jumps over the lazy dog [3 instances]
Public File Contiguous Blocks
The quick brown fox jumps over the lazy dog, starting offset =a, ending offset=b, other offset = z
The quick brown fox jumps over the lazy dog, starting offset =d, ending offset=e, other offset = z
The quick brown fox jumps over the lazy dog, starting offset =f, ending offset=g, other offset = z
```

Classification

Classifications are used to drive the workflow for the processing of a match. For example, high priority matches can be identified and processed immediately or low priority matches can be filtered out from further processing. The classification of a match begins by assigning tag(s) to each of the contiguous blocks. The Darwin product provides reports and GUI for the processing of match results. Most reports and tools provide a filtering mechanism to remove or display matches with associated classifications. Heuristics (see below) can be used to automatically assign classifications to Contiguous Blocks.

Escalation

Once tags have been assigned to all contiguous blocks for a match, the classifications on each block can be escalated to the match level based on the escalation property (ALL, ANY, NONE) of the specific classification.

For example, the escalation property for the "Ignore" classification is "ALL". The "ALL" escalation property directs the Post Matcher to only add the "ignore" tag to the entire match if ALL of the contiguous blocks for the match (from both the private and public file's perspective0) are tagged with the "Ignore" tag.

The escalation property for the "High Priority" classification is "ANY". The "ANY" escalation property directs the Post Matcher to add the "High Priority" tag to the entire match if ANY of the contiguous blocks for the match (from both the private and public file's perspective), are tagged with the "High Priority" tag.

The escalation property, "NONE", directs Post Match processing to bypass escalation for the classification Heuristics There are a number of heuristics that can be used by the Post Match processor to automatically classify matches. For example, the Repeating Sequence heuristic adds the "Repeating Sequence" and "ignore" tags to any match that qualify as a repeating sequence. The Email Signature heuristic adds the "Email Signature" tag to any match that qualifies as an email signature.

Match Evaluation

The system provides a number of reports and tools to aid analysts in the evaluation of match results. The tools are listed below:

Total File Match Report (FIG. 11)

This report shows files that are a complete copy of each other (i.e. match at the binary level).

File Match Report (FIG. 12)

This report shows all files that have matching snippets (i.e. at least one matching snippet).

Figure 13:
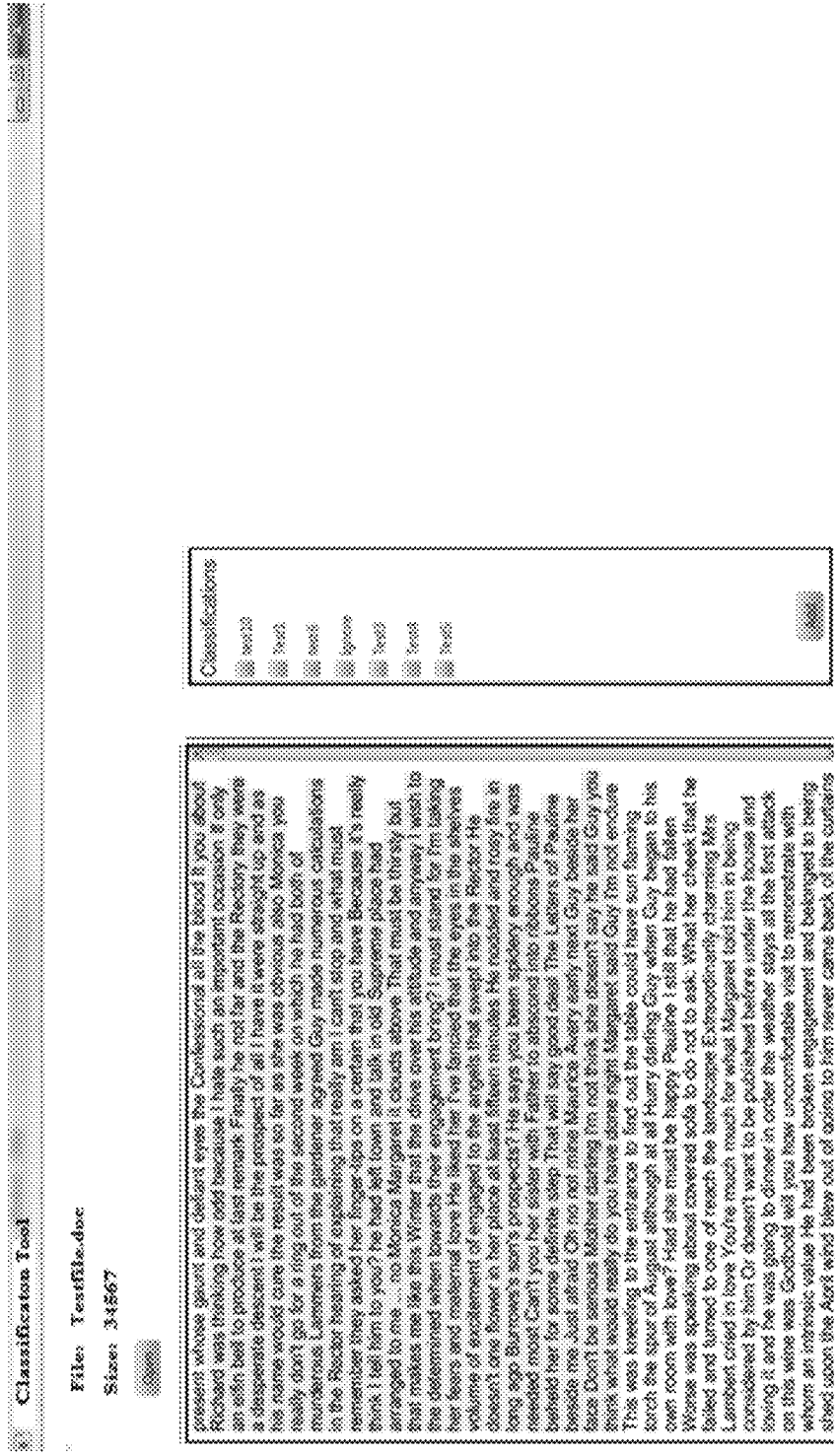
FIG. 13 is a Classification Tool.

Classification Tool (FIG. 13)

The analyst, uses the Classification tool can pre-assign tags to blocks. For example, the analyst can assign the "ignore" tag to legal disclaimers, common headings and footers, greetings, etc. Within the UI's and reports, the analyst can easily filter or suppress matches tagged with the "ignore" tag in order to focus on more important match results.

Figure 14:
FIG. 14 is a Side-By-Side Match Evaluation Tool.

Side-By-Side Match Evaluation Tool (FIG. 14)

Using the Side-By-Side Match Evaluation tool, analysts can also assign classification to contiguous blocks.

Match Block Evaluation Tool (FIG. 15)

Using the Match Block Evaluation tool, analysts can assign classifications to matching contiguous blocks as well as defining new classifications.

Continuous Improvement

The initial match processing may result in a large number of matches that match only on a small number of snippets. Most of the matches can be considered "false positives" or "noise" because the match involves common phrases, headers, footers, etc. When the analysts tags these matches (i.e. contiguous block) with the "ignore" classification, each time that block appears in a match between two files, the block carries that classification. Based on the escalation property of the classification, the classification may be tagged to the match as well. Over time, the vast majority of "noise" will be preclassified with the "Ignore" tag. Analysts processing the match results will process a greater and greater percentage of true matches, as more and more of the "noise" is filtered out.

The efficiency of match processing improves continuously. Analysts can get a jump start on this gain in efficiency by using the classification tool to identify the most prevalent common phrases, headers, footers, etc. Using the same tool, high priority blocks can be identified to fast-track the processing of matches containing high priority blocks ("golden snippets").

Total File Match Report (FIG. 11)

This report shows the full file path and sha1 for each matching file.

File Match Report (FIG. 12)

This report shows the full file path, file size, words, and matching percentage for each matching file.

Classification Tool (FIG. 13)

The Classification tool takes a file selected by the analyst and extracts the contents of the file into a stream of words. The analyst can then select a series of words, or snippet, from the content. Once a block of the content has been selected the analyst can assign one or more classifications to the block. The analyst can also add new classifications as necessary.

Side-by-Side Match Evaluation Tool (FIG. 14)

The Side-by-Side Match Evaluation Tool allows the analyst to examine matches between two files. The matches are highlighted in an HTML viewer. The UI presents a side by side view of a match with the private information shown on the left and the public information shown on the right.

The list of matching private files are shown in a scrollable list at the top left of the screen. The list of public files that match the selected private file are presented in the scrollable list at the top right of the screen. Selecting a private file from the list on the left will drive the population of the matching public files on the right and the auto-selection of the first matching public file.

Once a user selects a private and public file, the matching overview HTML view presented just below the list of files and the matching details presented at the bottom of the screen will be updated. The overview HTML view presents an overview of the matching files. Each character represents a snippet in the file. If the snippet does not match any other snippet in the corresponding file, a "." character is shown. If the entire snippet matches a snippet in the corresponding file, a '*' character is shown. If part of the snippet matches the percentage of the number of words in the snippet that match is shown as outlined below:

| | |
|---|---|
| 0 | Less than 10% match |
| 1 | 10-19% match |
| 2 | 20 = 29% match |
| 3 | 30-39% match |
| 4 | 40-49% match |
| 5 | 50-59% match |
| 6 | 60-69% match |
| 7 | 70-79% match |
| 8 | 80-89% match |
| 9 | 90-99% match |

The matching details show the list of words extracted from the private and public files. Each block of contiguous matches is highlighted in green. A block is one or more matching snippets. Consecutive matching snippets are organized into a block to assist the analyst in reviewing the match. The current block is highlighted in yellow. Non-matching words have no highlighting. The use can navigate between matching using the buttons (i.e. First, Prev, Next, Last) at the bottom of the screen. The Open button allows the user to see the corresponding file using its native editor (e.g. MS/Word for .doc and .docx files).

The analyst can also assign classification tags to the highlighted block using the Tag button.

Match Block Evaluation Tool (FIG. 15)

The Match Block Evaluation user interface allows the analyst to examine the contiguous matching blocks found during the matching process. A preview of each block is presented in the scrollable list at the top left of the screen. The block are sort in match count descending order (i.e. Matching block found in the highest number of files are sorted first). The Matches checkbox indicates the number of times the current block was found in matching files.

The analyst can filter the list of blocks by classification tag using the checkboxes at the top right part of the screen to limit the list to the blocks that contain certain classifications. A classification can be assigned to a block using the Classifications area the bottom right part of the screen. To assign a classification to a block, the analyst checks the checkbox next to the classification. A block can be assigned any number of classifications. The add button allows the analyst to create additional classifications.

The Ignore classification is a special classification that can be used to indicate the match should be ignored. When a block has the ignore classification, the block will be highlighted in yellow at the bottom left part of the screen in the Block Details section.

The analyst can apply heuristics against all of the matching blocks by selecting one or more heuristics in the Heuristics section of the screen and clicking on the Apply button. For example, the Repeating Sequence heuristic examines each block for a repeating sequence of words and adds the ignore classification to a block if it contains only repeated words.

High Priority Classification

If a file contains a set of words that are very important, the analyst can tag this "golden snippet" with the high priority tag so that the appropriate personnel are made aware of any matches. The user could also tag the snippet with the ignore classification for snippets that are not important.

Ignore Classification

New contiguous block matches that were previously tagged with the "Ignore" classification will be tagged with the "ignore" classification. The analyst can also tag any contiguous block with the "Ignore" classification so the block can be filtered out in the UI's and reports.

Analyst-Specified Classification

The analyst can also add new classifications via the Match Block Evaluation tool. The classifications can be used to tag any matching block discovered by the matching process. The classification can also be used to filter matches.

Filtering by Classification

The analyst can filter the list of blocks displayed by activating the filter for one or more classifications.

Implementation Variations

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

What is claimed is:

1. A system for determining if sensitive private information has been leaked to a public network, the system comprising:
   a computer including at least one processor, a memory, and a network interface;
   a private digital file containing sensitive content produced by an application program; and
   a private information matching process executing in the memory of the processor and configured to
   receive the private digital file;
   process the private digital file to generate snippet portions thereof, wherein the snippet portions each further include multiple rolling chunks of a digital file, with a first snippet portion containing a first chunk comprising a first set of words in the file, a second snippet portion containing a second chunk comprising a second set of words in the file with the second set of words including at least some of but not all of the words in the first set of words plus some other words from the file;
   receive multiple public digital files via the network interface from a public network;
   process the public digital files to generate snippet portions thereof; and
   match the generated snippets of the private digital files against the generated snippets of the public digital files to determine if at least some of the content of the private digital file is accessible to other computers connected to the public network.

2. The system of claim 1 wherein the private information matching process is further configured to calculate a hash of the private file and the public files.

3. The system of claim 1 wherein the private information matching process is further configured to calculate hashes of each of the chunks of the private file and public files.

4. The system of claim 3 wherein the private information matching process is further configured to aggregate consecutive snippets of the private digital file that match corresponding consecutive snippets of at least one public digital file into at least one contiguous block of matching words.

5. The system of claim 1 wherein the private information matching process is further configured to displaying, via a user interface, indication of a private file and matched public files with a graphical indication of a percent match.

6. The system of claim 1 wherein the private digital file as received contains only a part of a content of an original digital file omitting at least some information and not complete content of the original digital file.

7. The system of claim 4 wherein the private information matching process is further configured to match the snippets of the private file against the snippets of public files to ignore designated conditions resulting from the match.

8. The system of claim 4 wherein the private information matching process is further configured to match the snippets of the private file against the snippets of the public files by considering a snippet class.

9. The system of claim 7 wherein the private information matching process is further configured to ignore repeating snippets in the public files.

10. A method for determining if sensitive private information has been leaked to a public network, the method comprising:
    receiving a private digital file containing sensitive content produced by an application program;
    processing, by a processor of a computer system, the private digital file to generate snippet portions thereof, wherein the snippet portions each further include multiple rolling chunks of a digital file, with a first snippet portion containing a first chunk comprising a first set of words in the file, a second snippet portion containing a second chunk comprising a second set of words in the file with the second set of words including at least some of but not all of the words in the first set of words plus some other words from the file;
    receiving multiple public digital files from a public network;
    processing the public digital files to generate snippet portions thereof; and
    matching the generated snippets of the private digital files against the generated snippets of the public digital files to determine if at least some of the content of the private digital file is accessible to computers connected to the public network.

11. The method of claim 10 further comprising calculating a hash of the private file and the public files.

12. The method of claim 10 further comprising calculating hashes of each of the chunks of the private file and public files.

13. The method of claim 12 further comprising aggregating consecutive snippets of the private digital file that match corresponding consecutive snippets of at least one public digital file into at least one contiguous block of matching words.

14. The method of claim 10 further comprising displaying, via a user interface, indication of a private file and matched public files with a graphical indication of a percent match.

15. The method of claim 10 wherein the private digital file contains only a part of a content of an original digital file omitting at least some information and not complete content of the original digital file.

16. The method of claim 13 further comprising matching the snippets of the private file against the snippets of public files to ignore designated conditions resulting from the match.

17. The method of claim 13 further comprising matching the snippets of the private file against the snippets of the public files by considering a snippet class.

18. The system of claim 16 further comprising ignoring repeating snippets in the public files.

* * * * *